US006538216B2

(12) United States Patent
Batista et al.

(10) Patent No.: US 6,538,216 B2
(45) Date of Patent: Mar. 25, 2003

(54) SCALE WITH SIDEWAYS RAMP

(75) Inventors: Alexis Batista, 37-50 Junction Blvd., Corona, NY (US) 11368; Jonathan Batista, 37-50 Junction Blvd., Corona, NY (US) 11368; Juan Batista, 37-50 Junction Blvd., Corona, NY (US) 11368

(73) Assignees: Alexis Batista, Corona, NY (US); Juan Batista, Corona, NY (US); Jonathan Batista, Corona, NY (US)

( * ) Notice: Subject to any disclaimer, the term of this patent is extended or adjusted under 35 U.S.C. 154(b) by 98 days.

(21) Appl. No.: 09/764,727

(22) Filed: Jan. 19, 2001

(65) Prior Publication Data

US 2002/0096372 A1 Jul. 25, 2002

(51) Int. Cl.$^7$ ............................................... G01G 19/00
(52) U.S. Cl. ....................... 177/145; 177/126; 177/132; 198/435; 198/835
(58) Field of Search ............................... 177/126, 132, 177/142, 145; 198/360, 435, 448, 452, 835

(56) References Cited

U.S. PATENT DOCUMENTS

| 3,575,310 A | * | 4/1971 | Albertson | 198/435 |
|---|---|---|---|---|
| 4,126,197 A | | 11/1978 | Kechely | 177/145 |
| 4,258,814 A | | 3/1981 | Dillon | 177/126 |
| 4,431,104 A | * | 2/1984 | Orlowski et al. | 198/435 |
| 4,487,276 A | | 12/1984 | Swersey et al. | 177/126 |
| 4,559,981 A | | 12/1985 | Hirano | 177/114 |
| 4,804,074 A | * | 2/1989 | Scata' | 198/360 |
| 4,807,558 A | | 2/1989 | Swersey | 177/145 |
| 5,088,569 A | * | 2/1992 | Checcucci | 177/145 |
| 5,361,889 A | * | 11/1994 | Howell et al. | 198/360 |
| 5,408,054 A | * | 4/1995 | Brandorff et al. | 177/145 |
| RE35,555 E | * | 7/1997 | Sjogren et al. | 198/435 |
| 5,994,649 A | | 11/1999 | Garfinkle et al. | 177/25.11 |
| 6,329,613 B1 | * | 12/2001 | Tomlinson | 177/145 |
| 6,407,348 B1 | * | 6/2002 | Scott | 177/145 |

* cited by examiner

*Primary Examiner*—Randy W. Gibson

(57) ABSTRACT

A scale with sideways ramp (10) having a bottom conveyor (12A) which has a bottom conveyor belt (12AA) rotatably mounted on at least one bottom conveyor bottom spindle (12AB) and on at least one bottom conveyor top spindle (12AC). The bottom conveyor (12A) further has a bottom conveyor left support (12ADA) and a bottom conveyor right support (12ADB) each securely connected at a top end thereto. A bottom end of each of the bottom conveyor left support (12ADA) and the bottom conveyor right support (12ADB) are connected to opposite sides of a bottom conveyor (16). A top conveyor (12B) which has a top conveyor belt (12BA) rotatably mounted on at least one top conveyor bottom spindle (12BB) and on at least one top conveyor top spindle (12BC). The at least one top conveyor bottom spindle (12BB) is rotatably connected to the bottom conveyor top spindle (12AC) by a second motor connector (14B). A conveyor flap (12D) is movably securely mounted at opposite top corners to the bottom conveyor left support (12ADA) and the bottom conveyor right support (12ADB). A motor (14) is connected to the top conveyor top spindle (12BC) by a first motor connector (14A).

3 Claims, 2 Drawing Sheets

SCALE WITH SIDEWAYS RAMP

BACKGROUND OF THE INVENTION

1. Field of the Invention

The present invention relates to a sideways ramp. More particularly, the present invention relates to scale with sideways ramp functioning to reduce back injuries to airline check in employees.

2. Description of the Prior Art

Many attempts have been made to reduce the stress on an airline baggage handler's back. The present invention solves the problem.

Numerous innovations for scales and ramps have been provided in the prior art that are described as follows. Even though these innovations may be suitable for the specific individual purposes to which they address, they differ from the present invention as hereinafter contrasted.

In U.S. Pat. No. 5,994,649, titled, Portable weighing device for the mobility-disabled, invented by Garfinkle, et. al., a portable weighing device comprising two laterally displaced, electrically connected and rigidly aligned weighing modules is disclosed that permits convenient weighing of the mobility-disabled while occupying a conventional manually-operated wheelchair supported by two front caster wheels and two rear main wheels. The weighing platforms are so contoured that the wheelchair wheels can roll smoothly onto and off of the weighing platforms without disturbing the weighing device. The weighing device fully guides the operator through the sequence of steps required to weight the occupant of a wheelchair.

In U.S. Pat. No. 4,807,558, titled, Scale assembly, invented by Swersey, a scale for weighing bed-ridden patients includes two assemblies each of which has a pair of rollers mounted on a load frame upon which the entire bed can be elevated. The bed frame has two pairs of ramps mounted on an underside whereby the bed can be rolled onto the rollers. Each ramp has inclined surfaces to cause lifting of the bed onto the rollers of the scale assemblies.

In U.S. Pat. No. 4,559,981, titled, Controlled chute device, invented by Hirano, a controlled chute device, including a ramp chute having an entrance gate at the upstream and an exit gate at the downstream, for letting groups of product fed from the entrance gate slip down along it by gravity and discharging them from the exit gate, wherein the both entrance and exit gates are controlled sophisticatedly so that two or more groups of product sequentially fed from the entrance gate can exist on the chute at the same time without fear of contact and intermixture of the adjoining groups, which device is especially suitable for use in a combination weighing machine.

In U.S. Pat. No. 4,487,276, titled, Scale of flat construction, invented by Swersey, et. al., a scale is of limited height and utilizes Z-shaped flexures between the load frame and support frame. The scale can be placed in a hospital bed for weighing bed-ridden patients or for monitoring weight variations in bed-ridden patients. A cart is provided for transporting the scale from place to place and includes an inclined ramp from which the scale may be readily moved onto a bed.

In U.S. Pat. No. 4,258,814, titled, Weighing apparatus, invented by Dillon, portable low profile floor-mounted weighing device including a ramp to gain access to the weighing platform. The weight is sensed by a shear beam load cell that is attached to a vertical frame part by at least one fastener transverse to the direction of application of the load and transverse to the direction of the resisting force.

In U.S. Pat. No. 4,126,197, titled, Weighing ramp adaptor, invented by Kechely, a weighing ramp adaptor includes a frame having tab elements arranged to releasably fit the adaptor to a support platform of a weighing scale. The frame of the adaptor is formed and configured to have removably mounted thereto a wheelchair weighing ramp to thereby allow the weighing ramp to be attached to and used with the weighing scale.

The aforementioned patents differ from the present invention because the patented inventions do not describe and/or claim the following: flat scale to weigh baggage, movable or gravity slide ramp or chute positioned sideways to scale; and movable belt to transport baggage from scale.

Numerous innovations for a scale with sideways ramp have been provided in the prior art that are adapted to be used. Even though these innovations may be suitable for the specific individual purposes to which they address, they would not be suitable for the purposes of the present invention as heretofore described.

SUMMARY OF THE INVENTION

The present invention relates to a sideways ramp. More particularly, the present invention relates to scale with sideways ramp functioning to reduce back injuries to airline check in employees.

The types of problems encountered in the prior art are they do not address "in situ" handling of baggage.

In the prior art, unsuccessful attempts to solve this problem were attempted namely: different ramps and scale configurations. However, the problem was solved by the present invention because the present invention incorporated a scale into the handling device.

Innovations within the prior art are rapidly being exploited in the field of back strain relief.

The present invention went contrary to the teaching of the art which describes and claims different configurations of scales and ramps but never a combination of the two.

The present invention solved a long felt need for a baggage handler's back strain relief.

The present invention produced unexpected results namely: quicker handling and processing of airline baggage.

A synergistic effect was produced utilizing the present invention due to the following facts and results from experimentation: reduced back strain increased worker attendance reducing overall airline costs.

Accordingly, it is an object of the present invention to provide a scale with sideways ramp having a bottom conveyor, top conveyor, conveyor hinge, conveyor flap, motor, bottom conveyor, scale, and luggage.

More particularly, it is an object of the present invention to provide the bottom conveyor having a bottom conveyor belt, bottom conveyor bottom spindle, bottom conveyor top spindle, bottom conveyor left support, and bottom conveyor right support.

In keeping with these objects, and with others which will become apparent hereinafter, one feature of the present invention resides, briefly stated, in the top conveyor having a top conveyor belt, top conveyor bottom spindle, and top conveyor top spindle.

When the motor is designed in accordance with the present invention, it has a first motor connector and a second motor connector.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

LIST OF REFERENCE NUMERALS UTILIZED IN THE DRAWINGS

10—scale with sideways ramp (10)
12A—bottom conveyor (12A)
12AA—bottom conveyor belt (12AA)
12AB—bottom conveyor bottom spindle (12AB)
12AC—bottom conveyor top spindle (12AC)
12ADA—bottom conveyor left support (12ADA)
12ADB—bottom conveyor right support (12ADB)
12B—top conveyor (12B)
12BA—top conveyor belt (12BA)
12BB—top conveyor bottom spindle (12BB)
12BC—top conveyor top spindle (12BC)
12C—conveyor hinge (12C)
12D—conveyor hinge (12D)
14—motor (14)
14A—first motor connector (14A)
14B—second motor connector (14B)
16—bottom conveyor (16)
18—scale (18)
20—luggage (20)

DESCRIPTION OF THE PREFERRED EMBODIMENT

Figure 1:
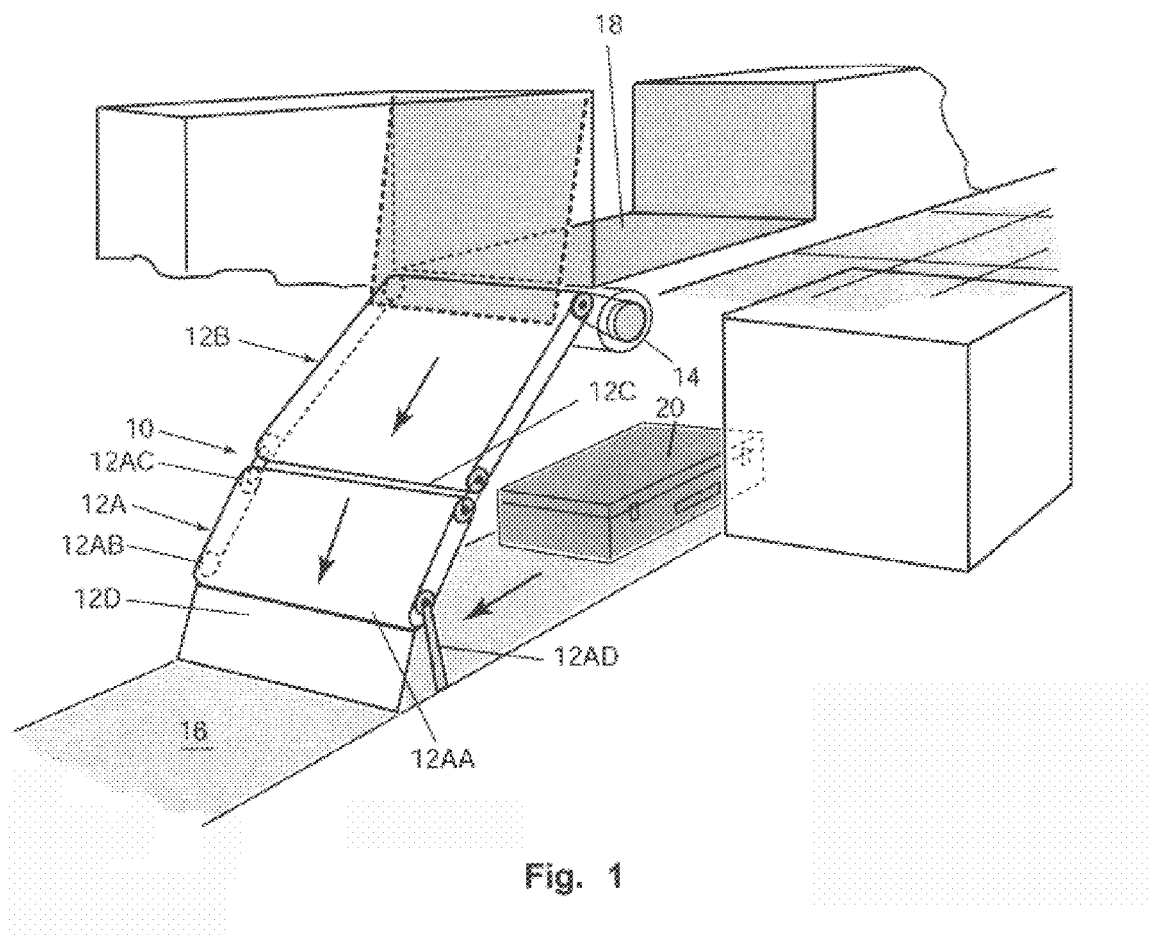
FIG. 1 is a top right perspective view of a scale with sideways ramp (10).
Figure 2:
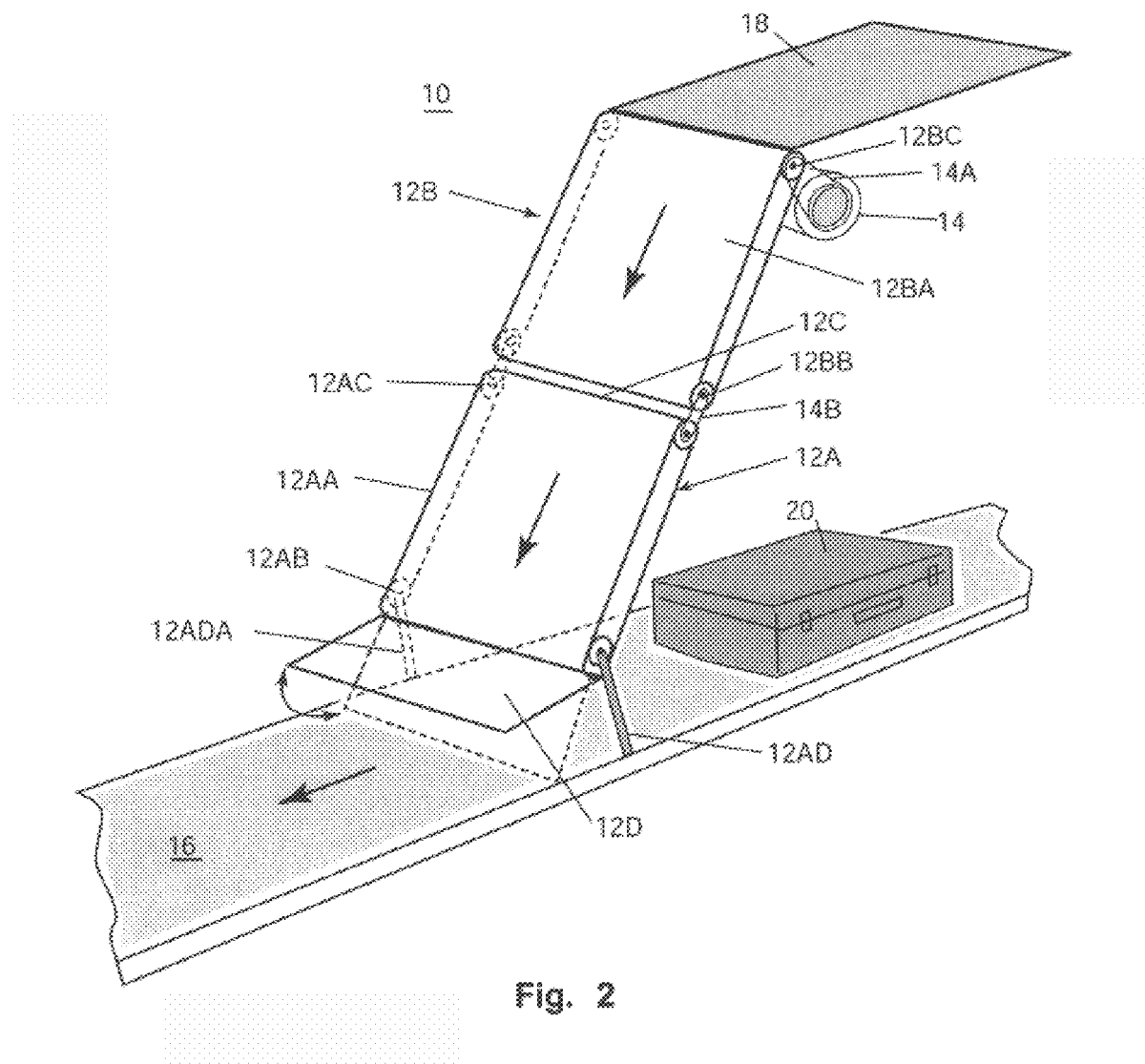
FIG. 2 is a right side view of a scale with sideways ramp (10).

Referring to FIG. 1 and FIG. 2 are top right perspective view and right side view of a scale with sideways ramp (10), respectively. The scale with sideways ramp (10) comprises a bottom conveyor (12A) which comprises a bottom conveyor belt (12AA) rotatably mounted on at least one bottom conveyor bottom spindle (12AB) and on at least one bottom conveyor top spindle (12AC). The bottom conveyor (12A) further comprises a bottom conveyor left support (12ADA) and a bottom conveyor right support (12ADB) each securely connected at a top end thereto. A bottom end of each of the bottom conveyor left support (12ADA) and the bottom conveyor right support (12ADB) are connected to opposite sides of a bottom conveyor (16).

The scale with sideways ramp (10) further comprises a top conveyor (12B) having a top conveyor belt (12BA) rotatably mounted on at least one top conveyor bottom spindle (12BB) and on at least one top conveyor top spindle (12BC). The at least one top conveyor bottom spindle (12BB) is rotatably connected to the bottom conveyor top spindle (12AC) by a second motor connector (14B) functioning to rotate the bottom conveyor belt (12AA) and the top conveyor belt (12BA). The top conveyor (12B) is positioned at a top end adjacent to a scale (18). A conveyor hinge (12C) is optionally securely mounted between the top conveyor bottom spindle (12BB) and the bottom conveyor top spindle (12AC).

The scale with sideways ramp (10) further comprises a conveyor flap (12D) movably securely mounted at opposite top corners to the bottom conveyor left support (12ADA) and the bottom conveyor right support (12ADB). The conveyor flap (12D) functions to permit luggage (20) movably positioned on the bottom conveyor (16) to move past the scale with sideways ramp (10).

The scale with sideways ramp (10) further comprises a motor (14) connected to the top conveyor top spindle (12BC) by a first motor connector (14A). The motor (14) functions to rotate the top conveyor (12B) and the bottom conveyor (12A) transporting luggage from the scale (18) to the bottom conveyor (16).

It will be understood that each of the elements described above, or two or more together, may also find a useful application in other types of constructions differing from the type described above.

While the invention has been illustrated and described as embodied in a scale with sideways ramp, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

What is claimed is:

1. A scale with sideways ramp (10) comprising;
   A) a bottom conveyor (12A) which comprises a bottom conveyor belt (12AA) rotatably mounted on at least one bottom conveyor bottom spindle (12AB) and rotatably mounted on at least one bottom conveyor top spindle (12AC), the bottom conveyor (12A) further comprises a bottom conveyor left support (12ADA) and a bottom conveyor right support (12ADB) each securely connected at a top end to opposite ends of the bottom conveyor bottom spindle (12AB), a bottom end of each of the bottom conveyor left support (12ADA) and the bottom conveyor right support (12ADB) are connected to a right side and left side of a bottom conveyor (16);
   B) a top conveyor (12B) which comprises a top conveyor belt (12BA) rotatably mounted on at least one top conveyor bottom spindle (12BB) and rotatably mounted on at least one top conveyor top spindle (12BC), the at least one top conveyor bottom spindle (12BB) is rotatably connected to the bottom conveyor top spindle (12AC) by a second motor connector (14B);
   C) a conveyor flap (12D) is movably securely mounted at opposite top corners to the bottom conveyor left support (12ADA) and the bottom conveyor right support (12ADB); and
   D) a motor (14) is connected to the top conveyor top spindle (12BC) by a first motor connector (14A).

2. The scale with sideways ramp (10) as described in claim 1, wherein a conveyor hinge (12C) is securely mounted between the top conveyor bottom spindle (12BB) and the bottom conveyor top spindle (12AC).

3. The scale with sideways ramp (10) as described in claim 1, wherein a scale (18) is positioned adjacent to a top end of the top conveyor (12B).

* * * * *